Jan. 7, 1969      G. E. BROWN, JR      3,420,454
APPARATUS FOR DEFIBERING CELLULOSIC MATERIAL IN WATER
Filed Jan. 4, 1965
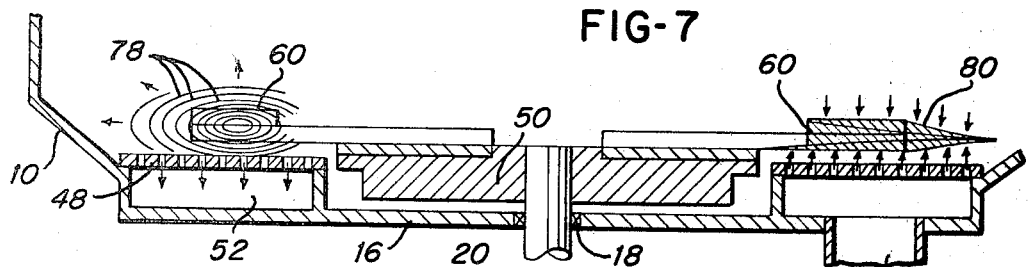
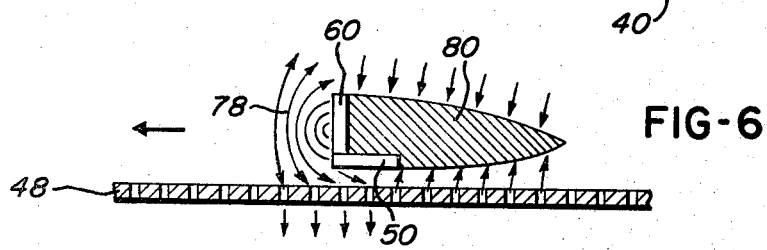
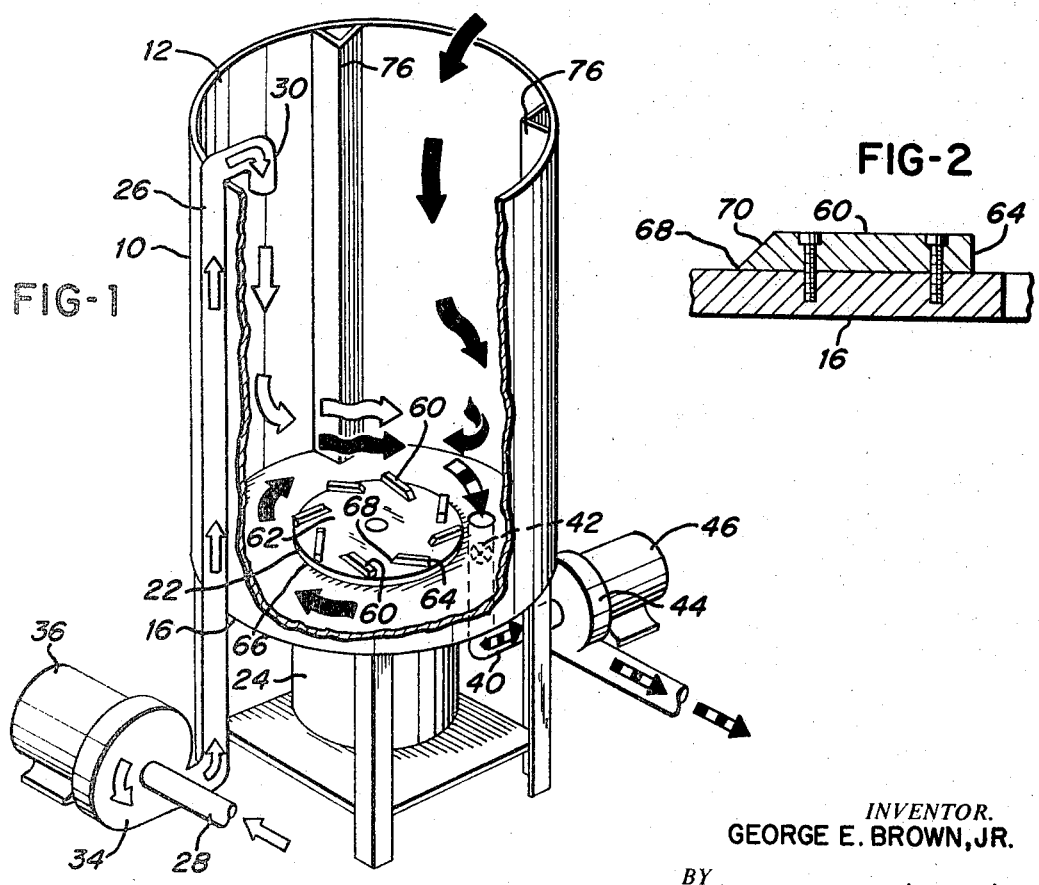
INVENTOR.
GEORGE E. BROWN, JR.
BY
J. Warren Kinney Jr.
ATTORNEY Jan. 7, 1969 G. E. BROWN, JR 3,420,454
APPARATUS FOR DEFIBERING CELLULOSIC MATERIAL IN WATER
Filed Jan. 4, 1965 Sheet 3 of 3

INVENTOR.
GEORGE E. BROWN, JR.
BY
ATTORNEY

United States Patent Office 3,420,454
Patented Jan. 7, 1969

3,420,454
APPARATUS FOR DEFIBERING CELLULOSIC
MATERIAL IN WATER
George E. Brown, Jr., Cincinnati, Ohio, assignor to Fibers Unlimited, Inc., Cincinnati, Ohio, a corporation of Ohio
Filed Jan. 4, 1965, Ser. No. 422,971
U.S. Cl. 241—46    7 Claims
Int. Cl. B02c *13/14;* D21b *1/32*

ABSTRACT OF THE DISCLOSURE

The breaking down or defibering of scrap or waste cellulosic sheet material wherein the sheet material and water are placed in a container, the container having in the bottom portion thereof a rotor carrying on its working face vanes of relatively small size with respect to the rotor which, when operated at high speed, will cause compressional waves in front of the vanes and voids in the rear with the material having a tendency by cavitation to enter into the voids and whereby sonic shocks are produced to break down the fibrous material.

---

The present invention relates to a method and means for defibering cellulosic sheet material, such as scrap or waste paper from various sources of supply. Some of the most valuable long-fiber scrap papers available for defibering or repulping, are those known as wet-strength papers, which do not readily lend themselves to repulping by conventional methods, so that the processing of such papers has presented many problems and difficulties attended largely by disappointing results.

Some of the wet-strength papers which are highly resistive to defibering, are those comprising a fiber web to which has been added a synthetic resin of the phenol-formaldehyde, urea-formaldehyde, melamine-formaldehyde, or epichlorohydrin type. These papers, with some difficulty, and with only partially satisfactory results, have been defibered or repulped by subjecting them to hydraulic shear in a water slurry at elevated temperatures, and with the addition of mineral acids or acid salts reducing the slurry to a pH value of 2.0 to 3.5. The procedure involved shearing for an extended period of time, in some cases up to two hours, at temperatures ranging between 180° and 210° F.

Treatment of the kind above mentioned is very damaging to the fiber sought to be reclaimed, resulting in a substantial loss of fiber strength due to a lowering of its degree of polymerization of the cellulose molecule by acid hydrolysis, and to the excessive shearing time found necessary, which undesirably shortened the fibers. The treatment referred to, moreover, is expensive of performance and created working conditions of an undesirable nature.

A primary object of the present invention is to provide a method and means for repulping papers such as wet-strength papers, and other which are difficult to repulp, without resorting to acid or caustic treatment, elevated temperatures, and extended shear time, thereby to achieve much lower production costs and a much higher quality of fiber which is in great demand.

Another object of the invention is to provide an improved method and means for repulping any and all grades of scrap paper, pulp board, or coated or internally reinforced board, with the attainment of high yield in a shortened treatment period, a significant lowering of production costs, and substantial preservation of the fiber properties of the raw material presented for treatment. Thus, the improved procedure when applied to low-cost scrap, is highly effective to produce with dispatch, a yield of fiber differing very little from the fiber originally incorporated in the scrap.

A further object is to provide means in an improved form of pulper, for generating and utilizing shock waves, as distinguished from simple shear force, in separating the fibers constituting the material in process.

The foregoing and other objects are attained by the means described herein, and as disclosed in the accompanying drawings, in which:

FIG. 1 is a perspective view, partly cut away, illustrating a pulper of modest size and capacity embodying the present invention.

FIG. 2 is an enlarged fragmentary cross-section taken on line 2—2 of FIG. 4, and illustrating details of a rotor vane or blade.

FIG. 6 is an enlarged schematic view, partly in cross-section, indicating areas of compression and cavitation occurring in advance of and behind a rapidly moving rotor blade or vane.

FIG. 7 is an enlarged cross-section taken horizontally through the center of FIG. 5, indicating shock waves generated in advance of and behind two rapidly moving rotor blades or vanes.

Figure 3:
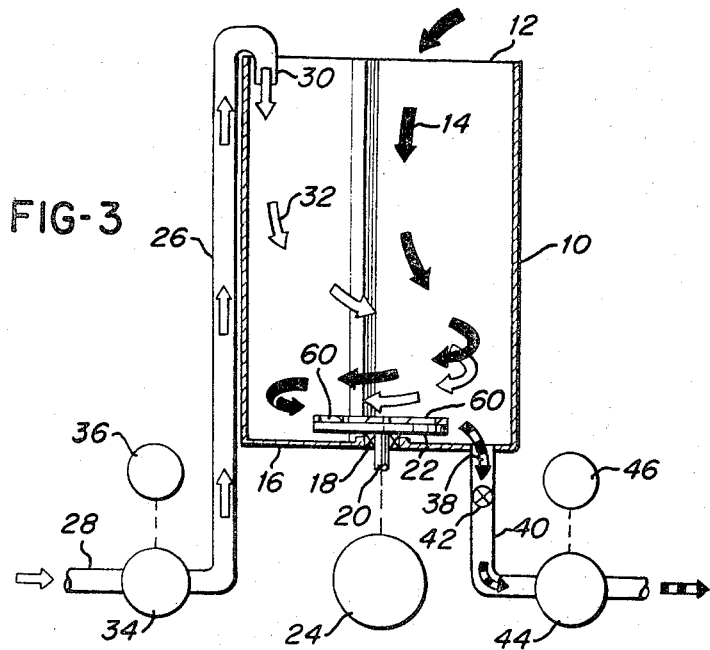
FIG. 3 is a vertical cross-section of the improved pulper, indicating flow of slurry therethrough.
Figure 4:
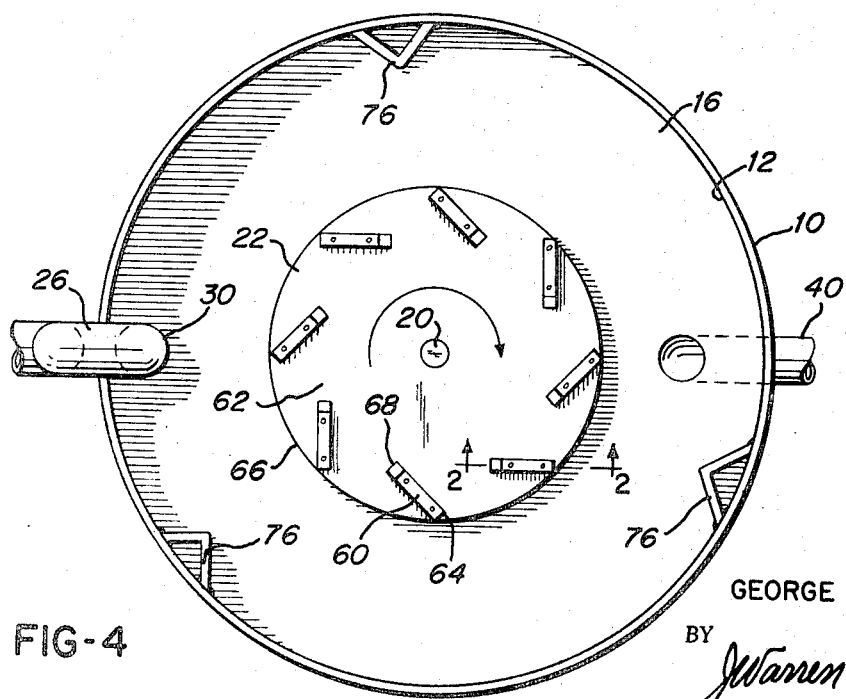
FIG. 4 is an enlarged top plan view of the pulper.

In general, the improved pulper as disclosed by FIGS. 1 to 4, may comprise a tank 10, preferably cylindrical in form, and having at its top a charging opening 12 to receive a quantity of scrap paper to be defibered, such paper being denoted by the solid arrows 14. The tank includes a bottom wall 16 carrying a leak-proof bearing 18 for the drive shaft 20 of a rotor member 22, to be driven by a motor 24.

A pipe 26 delivers water at ambient or normal supply temperature from a source of supply 28 to the interior of the tank, as at 30, the water being identified by open arrows 32. If necessary, volume of incoming water may be boosted by means of a pump 34 and motor 36.

After the water and scrap paper have been reduced to slurry in proper degree by the action of the rotor member, the slurry 38 may be drawn from the tank by way of pipe 40 and control valve 42, preferably with the aid of a pump 44 driven by a motor 46.

Figure 5:
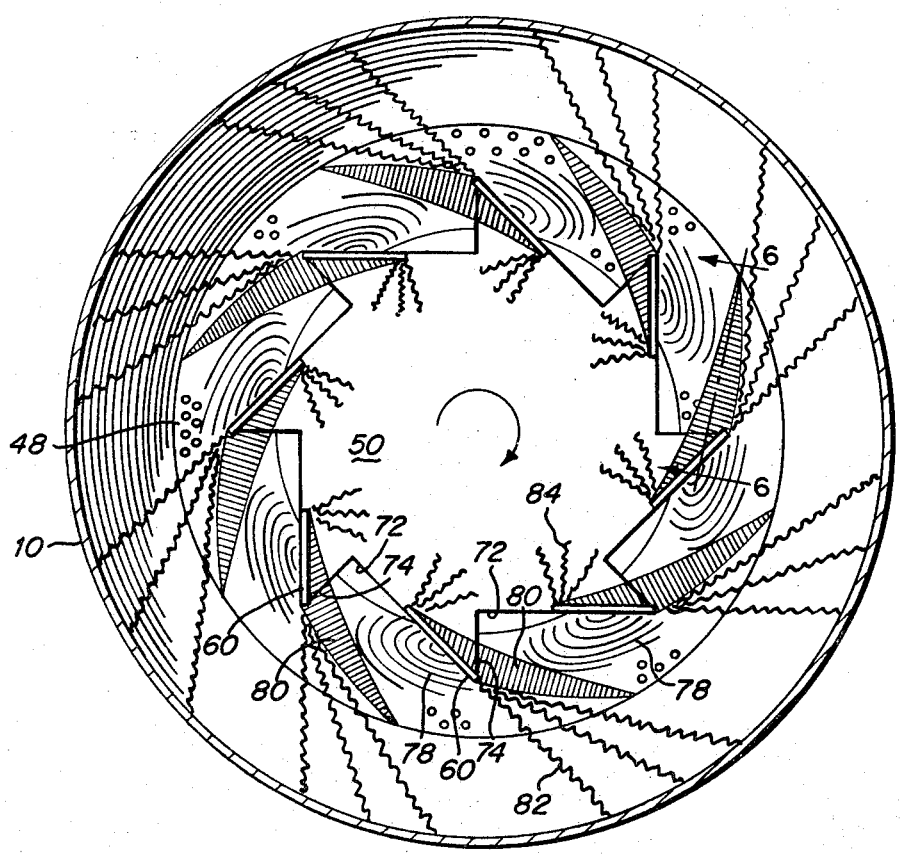
FIG. 5 is a horizontal cross-section, looking down into the tank of a large, high-capacity form of pulper and illustrating generation of defibering shock waves in a slurry acted upon by the rotor and its blades or vanes while in rapid rotation.

The modified structure of FIGS. 5, 6 and 7, is distinguished from that of FIGS. 1 to 4, in that the rotor 50 is toothed in the manner of a circular rip saw (FIG. 5), and the tank bottom 16 is developed to provide a circular foraminous plate or screen 48 elevated slightly inside the cylindrical wall, to provide a subjacent chamber 52 having connection with a drain pipe such as 40, the screen being adapted to strain slurry removed from the tank after processing. The device of FIGS. 5 to 7 is a large high-capacity version of the smaller FIG. 1 device.

It must be appreciated that the structures above described are to be operated and utilized to defiber scrap paper and the like in accordance with a novel technique or process, which speeds the defibering process and minimizes deterioration of fiber quality, all as set forth in the preceding objects of the invention, without the use of chemicals and/or applied heat.

Considering first the simpler and smaller device of FIGS. 1 to 4, it is noted that the circular rotor member carries a number of fixed elongate vanes 60, applied to the upper flat surface 62, the vanes having trailing ends 64 equally spaced from one another along the periphery 66 of the rotor member or disc 22. Each vane has a leading end 68 projected in the general direction of disc rotation, with the major axis of the vane disposed upon a chord of the disc circle, and the trailing end of the vane coinciding with the trailing end of the chord. Where the trailing end of the vane meets a disc radius intersecting the trailing end of the chord, the included angle may range between 1 degree and 89 degrees. In the drawings, the angle indicated approximately 45 degrees, by way of example. It is noted also that the leading end of each vane is tapered to provide a rearwardly inclined face 70 which meets the upper face of the rotor disc at an angle approximating 45 degrees, FIG. 2.

It is important to note that the height of each rotor vane 60, or the distance it extends upwardly from the face 62 of the rotor member, is held at a minimum so as to minimize the beating and tearing action imposed by the vanes upon the paper stock. The reason for this is that the defibering function shall be dependent not upon a beating or tearing action of the vanes per se upon the stock, but upon generation of shock waves by high-speed advancement of the vanes through the slurry, resulting in action which "shakes" the fibers apart without appreciable fracture and reduction of fiber length. The desired shock wave performance is attained in the operation of both illustrated forms of mechanism depicted by FIGS. 1 through 4, and FIGS. 5 through 7. The latter drawing figures are embellished to explain the shock wave action.

The large commercial apparatus of FIGS. 5 through 7, may, by way of example comprise a cylindrical tank measuring 12 feet in diameter, and 10 or 11 feet in height, having a capacity approximating 550 cubic feet. The rotor member 50 may be in the form of a metallic plate one inch thick, having an overall diameter of 60 inches, with portions cut away along the perimeter as at 72, to expose the screen 48 and provide a series of outward projections 74 carrying the angularly disposed vanes 60. The nature and disposition of the vanes has been previously described.

Uniformly satisfactory results have been obtained in those instances in which each vane is approximately 13 inches long and one inch high. The rotor member carrying the vanes is driven at a peripheral speed of 65 to 70 feet per second, utilizing an electric motor rated at 250 horsepower. The tank carries 3,500 to 3,800 pounds of paper stock to be defibered, in 30,000 pounds of water at ambient or room temperature. The water carries no chemicals, and is not pre-heated. The inside of the tank wall carries a plurality of fixed upright diverters, such as are indicated at 76 upon FIG. 1, which oppose rotation of the paper stock and water as the rotor member rotates, and cause circulation of the mixture in generally upward and downward directions.

When the rotor member vanes are advanced at such speed and with sufficient power to overcome the internal cohesive force of the water molecules, cavitation will occur behind the vanes 60. The voids of cavitation formed will instantaneously collapse, with an inrush of incompressible water filling the voids and generating shock waves which are utilized in the instant process.

As noted upon FIGS. 5, 6 and 7, each vane 60 when moving at the speed indicated, drives through the slurry of the tank to shear the fluid media at high speed, to produce at the forward face of each vane, compressional waves indicated by the curved lines 78. Coincidentally, there is established behind each vane a cavitational void, indicated by the shaded portions 80 of the drawing. As slurry rushes in to fill the voids, sonic shock waves 82 and 84 are generated in force, to shake the paper particles and surrounding fluid in such manner as to loosen and separate the fibers, and disperse them in the fluid without objectionably breaking the fibers and reducing their length. FIG. 7 indicates at the left a blade 60 moving toward the viewer, and a similar blade at the right receding from the viewer, generating compressional waves and a cavitational void, respectively.

The sonic shock waves indicated are generated continuously as long as the specified rotor speed is maintained; and the required rotor speed is assured throughout the entire defibering period by supplying ample driving power to avoid any reduction of rotor speed that might be prompted by changes in density of the slurry resulting from temperature rise and a growing viscosity resulting from fiber separation. It may here be noted that the slurry temperature may rise due to the natural result of agitation, from ambient starting temperature to a temperature approximating 110 degrees F., which further promotes defibering.

It is believed that the sonic shock waves produced by the related compression of slurry and collapse of the cavitational voids mentioned, radiate inwardly of the rotor member and outwardly against the wall of the tank, to reach a substantial portion of the slurry therein contained. Circulation of the slurry by the action of diverters 76 assures that all of the slurry, during a defibering period, will have been subjected to sonic wave treatment for rapid and complete fiber separation.

The time required for defibering a given paper stock in the foregoing example, is dependent upon the nature of the stock, however, the subject apparatus and method permits a superior defibering operation to be completed in from $\frac{1}{4}$ to $\frac{1}{10}$ of the time required by the systems presently in use. Moreover, the conventional methods invariably utilize preheated water and chemical additives which not only increase processing costs, but depreciate the quality and value of the fiber recovered. Quite obviously, the elimination of chemicals, handling and storage at the defibering or repulping plant, is a matter of prime advantage, as is also the elimination of boilers and fuel for water preparation.

The apparatus of FIGS. 5, 6 and 7, having the capacity previously specified, may be altered structurally to vary the output, as follows:

| Peripheral speed of rotor (ft./sec.) | Motor horse power | Height of vane in inches | Length of vane in inches |
|---|---|---|---|
| 65–70 | 200 | $\frac{1}{2}$–$\frac{5}{8}$ | 12$\frac{1}{2}$–13 |
| 65–70 | 250 | 1 | 13 |
| 65–70 | 300 | 1$\frac{3}{8}$ | 13 –13$\frac{1}{2}$ |

The purpose of screen 48 in FIGS. 5, 6 and 7, is to preclude passage of any large particles of foreign matter or undefibered stock which might foul the pump, as the pump operates to empty the tank upon termination of a defibering cycle. The holes of the screen may approximate one-eighth inch in diameter. If the apparatus is constructed without a screen, following therefore the teaching of FIG. 1, the tank bottom may be imperforate and substantially planar, and the rotor member may have a plain circular periphery in accordance with FIG. 1.

As was previously pointed out, the apparatus of FIGS. 1 through 4 is a relatively small machine, compared to that of FIGS. 5 through 7. The smaller machine of FIGS. 1 to 4 may have the following dimensions and requirements:

Tank (10)—48 inch diameter; 72 inch height.
Rotor (22)—24 inch diameter; 1 inch thickness.
Speed of rotor—peripheral speed 145 ft./sec. (minimum).
Vane (60)—4.5 inch long; .75 inch height.
Diverters (76)—5 x 5 inch angle iron.
Motor (24)—75 horsepower.
Tank capacity—300 pounds dry charge of paper.

A machine having the above specifications will defiber a 300 pound charge of dry pulp board, cylinder board, or Fourdrinier board (16 points and up), mixed with ambient temperature water and no chemicals, in 3.5 to 4.0 minutes. A conventional machine of the same capacity, utilizing water preheated to 120 degrees F., and chemicals to reduce the slurry to a pH of 7 or 8, required an operating period of 25 to 30 minutes.

The same machine, having the above listed specifications, will defiber a 300 pound dry charge of wet-strength papers mixed with ambient temperature water and no chemicals, in 13 minutes. A conventional machine of the same capacity, utilizing water at 210 degrees F., and chemicals to reduce the slurry to a pH of 2.5 to 3.0, required an operating period of 1.75 to 2.5 hours to defiber the same kind of paper.

It is to be understood that the method and means of the present invention discard the operating principles of hydraulic shear separation, which characterized all pulpers and repulpers in the past. By the present method and apparatus, greatly superior results are obtained with the production and use of sonic shock waves generated by the collapse of cavitational voids at the rotor vanes, as explained. The sonic shock wave treatment may be utilized in the production of fibers from many source materials, including cotton, flax, and many types of wood, as well as in the repulping of scrap papers. In the primary pulping procedure, as well as in repulping paper scrap, no chemicals are employed and the water utilized is fed to the treatment tank at ambient or room temperature.

As previously stated herein, the improved method and apparatus of the present invention assures significant high production coupled with very substantial savings of time, manpower, and the expense of chemicals and heating. In addition, low cost raw materials may be processed, with preservation of all fiber properties for further reprocessing.

I claim:

1. Apparatus for defibering cellulosic material in water free of chemical additives comprising in combination a cylindrical tank having a side wall and a bottom, a rotor plate within the tank disposed in substantial parallelism with the tank bottom, said plate having a face portion and a peripheral portion spaced from the tank side wall, drive means for rotating said rotor plate in one direction, a series of elongate vanes fixed upon the rotor plate face portion at an angle to the radius thereof in the direction of rotation, said vanes each having a leading end at an angle to the face portion, a blunt trailing end and a forward face, the leading ends each extending in the general direction of rotation and the trailing ends each being equally spaced apart near the peripheral portion of the plate, with the forward face of each vane disposed at an acute angle to a rotor plate radius intersecting the trailing end of the vane, each vane having a height of about the same thickness as the rotor plate and being of a length of about .20 of the diameter of the rotor plate; the height, length and angularity of the forward face of each vane being coordinated with the power and speed of rotation whereby advancement of each vane produces at the forward face thereof a zone of compression and at the rear of each vane a cavitational void of such value that inrush of material to fill the void generates sonic shock waves active to separate the fibers of the water-borne cellulosic material within the tank thus maintaining the length and properties of the individual fibers substantially in their original condition and means within the tank opposing movement of the water-borne material in the direction of rotation of the rotor plate.

2. Apparatus as set forth in claim 1 wherein the rotor plate is about 60 inches in diameter and 1 inch thick and is driven at a peripheral speed of about 65 to 70 feet per second, the height of each vane being ½ to 1⅜ inches and the length of each vane being about 12½ to 13½ inches.

3. Apparatus as defined in claim 1 wherein the rotor plate is about 24 inches in diameter and 1 inch in thickness and is driven at a peripheral speed of about 145 feet per second and each vane is about 4½ inches long and about ¾ inch in height.

4. Apparatus as defined in claim 1 wherein a portion of the tank bottom is foraminous and includes means for draining the tank and straining any particles of scrap from the mixture.

5. Apparatus as defined in claim 1 wherein the tank bottom is solid and has a drain opening therein for draining the mixture.

6. Apparatus as defined in claim 1 wherein the rotor is mounted upon a vertical axis and the elongate vanes extend upwardly from the horizontal face of said rotor.

7. Apparatus as defined in claim 1 wherein the means opposing movement of the water-borne material comprises a plurality of equally spaced affixed upright diverters on the inner surface of the tank side wall, the diverters opposing rotation of the material, but causing circulation of the material in generally upward and downward directions whereby the material is circulated and subjected to the sonic shock wave action.

References Cited

UNITED STATES PATENTS

| | | | |
|---|---|---|---|
| 1,579,461 | 4/1926 | Winestock | 162—4 |
| 2,729,856 | 1/1956 | Horton | 241—28 X |
| 2,916,412 | 12/1959 | Altmann | 162—4 |

OTHER REFERENCES

TAPPI Deinking Conference, Inserra, from Pulp and Paper, pp. 37, 38, 39, Oct. 29, 1962.

HOWARD R. CAINE, *Primary Examiner.*

U.S. Cl. X.R.

162—4, 28; 241—185, 301